March 20, 1951     F. E. SANBORN     2,545,632
VALVE ACTUATING MECHANISM
Filed Nov. 22, 1946     2 Sheets-Sheet 1
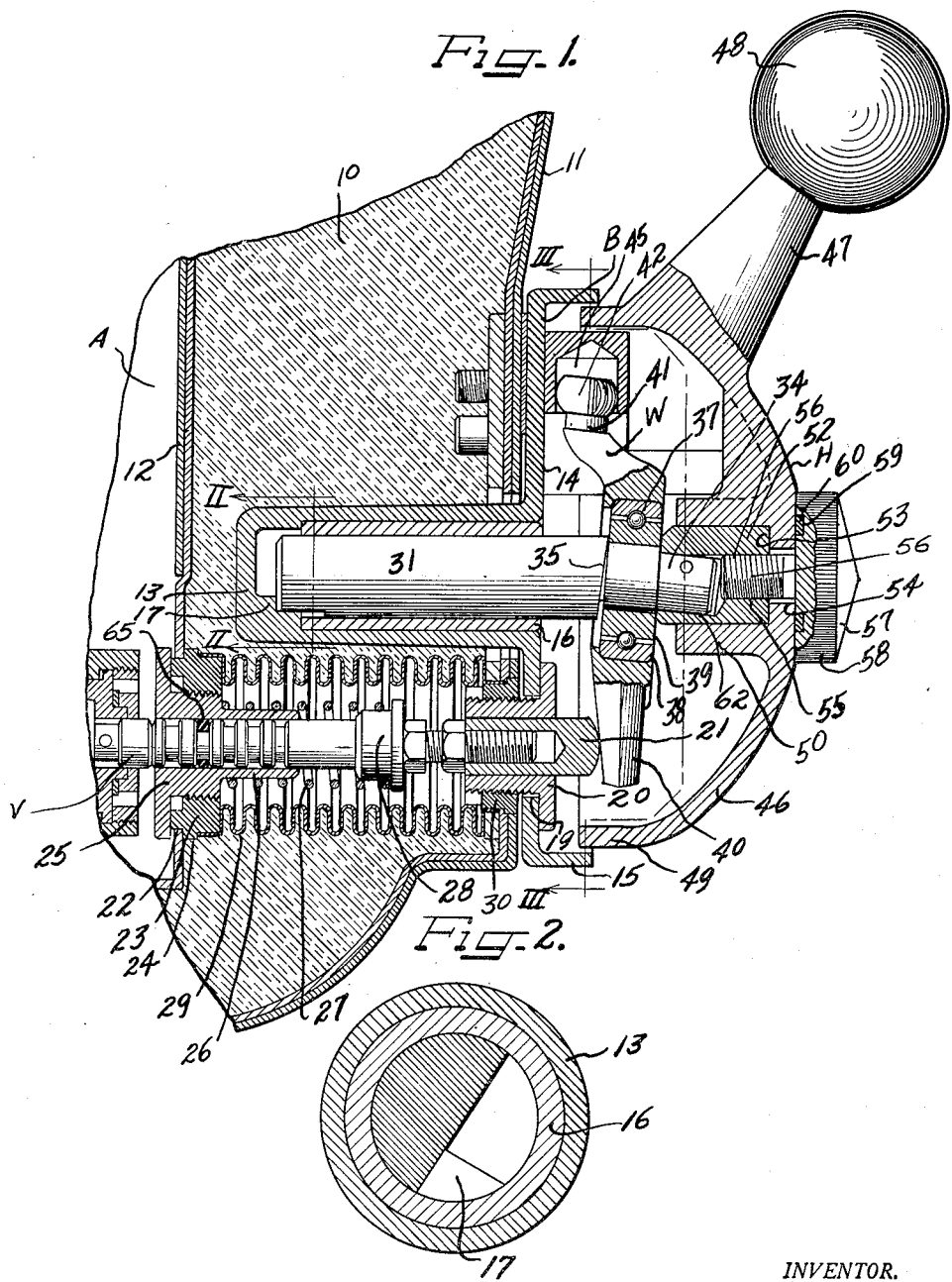
INVENTOR.
FRANK E. SANBORN

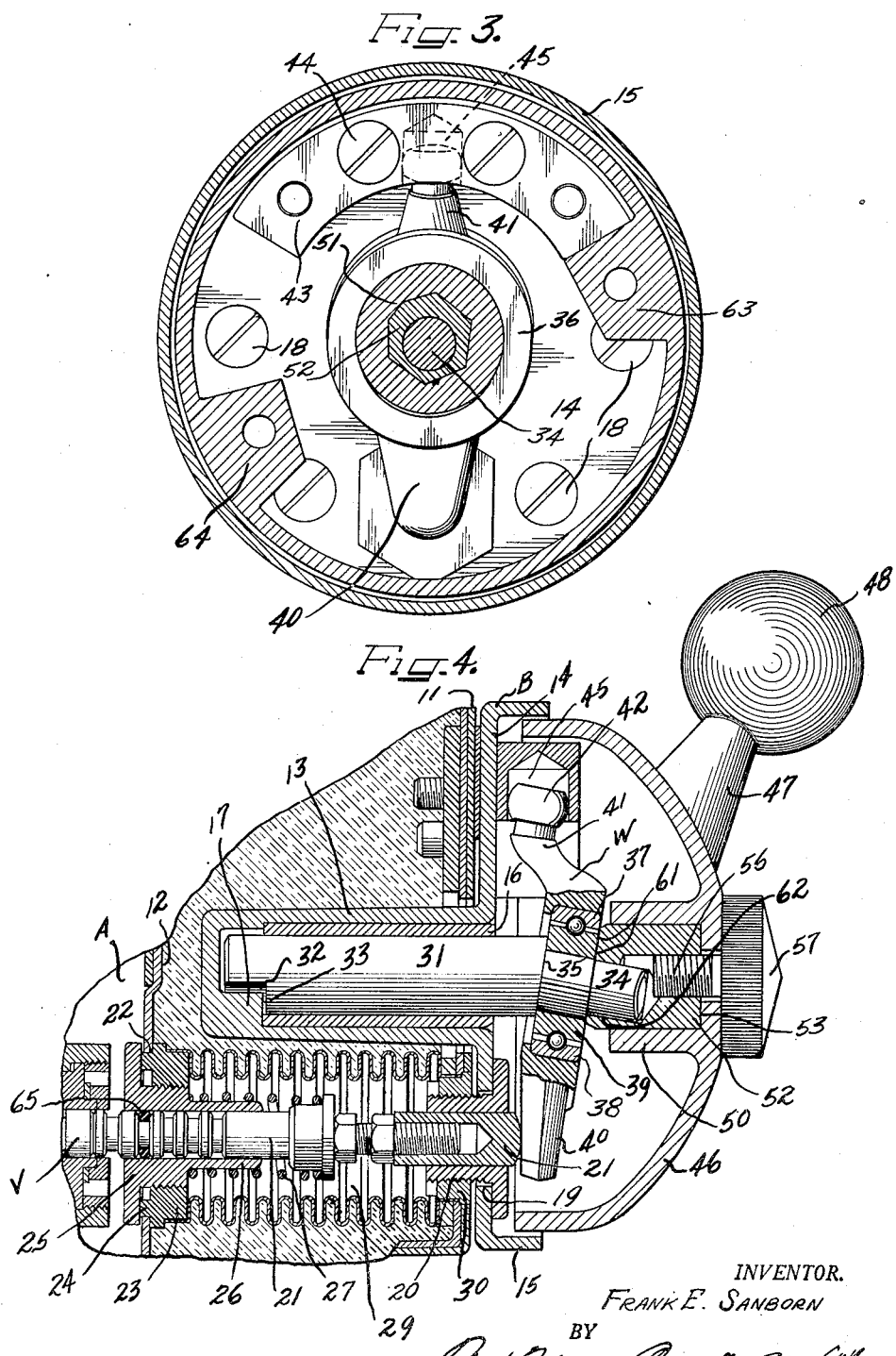

Patented Mar. 20, 1951

2,545,632

UNITED STATES PATENT OFFICE 2,545,632

VALVE ACTUATING MECHANISM

Frank E. Sanborn, Chicago, Ill., assignor to The Dole Valve Company, Chicago, Ill., a corporation of Illinois Application November 22, 1946, Serial No. 711,487

9 Claims. (Cl. 74—99)

The present invention relates generally to a valve actuating mechanism, and more particularly to a valve actuating mechanism for a beverage dispenser.

It is an object of the present invention to provide a valve actuating mechanism in which friction is reduced to a minimum to thereby eliminate the need for lubrication of certain of the cooperating parts and thus remove any possibility of contamination of beverages where the valve is used in a beverage dispenser.

Another object of the present invention is to provide, in a valve actuating mechanism, means for actuating a valve stem with a minimum of relative movement between the stem and its actuator.

A further object of the present invention is to provide a valve actuating mechanism in which relative movement between the stem and its actuator may embody a rolling contact to reduce friction to a minimum.

A still further object of the present invention is to provide a valve actuating mechanism in which means having gyratory or wobble action are used to move the valve stem in valve opening direction.

The invention has for an additional object the provision of novel means for imparting wobble action to a member of a valve mechanism.

A yet further object of the present invention is to provide a valve actuating mechanism in which a reciprocable valve stem is operated by an oscillating handle through the instrumentality of a rockable part.

A still further object of the present invention is to provide a valve actuating mechanism in which a reciprocable valve stem is moved in valve opening direction by means of a wobble member, a portion of which is in contact with the stem, and which works with somewhat of a wiping action as the handle is moved to open the valve.

In accordance with the general features of this invention there is provided in a valve actuating mechanism for translating rotating movement into a reciprocatory valve plunger actuating movement, a rotatable element, a reciprocable stem, and a wobble connection between said element and stem universally connected to one, and only frictionally bearing against the other.

The above, other and further objects and features of the present invention will be apparent from the following description and accompanying drawings.

An embodiment of the present invention is illustrated in the accompanying drawings and the views thereof are as follows:

Figure 1 is a fragmental vertical sectional view through a part of a beverage dispenser and through the valve actuating mechanism therefor which includes the mechanism of the present invention and is shown with the valve stem in valve closing position;

Figure 2 is an enlarged sectional view taken in the plane of line II—II of Figure 1;

Figure 3 is a vertical sectional view taken along the line III—III of Figure 1; and Figure 4 is a view similar to Figure 1 showing the relationship of the parts when the valve stem has been moved to valve opening position by rotative movement of the valve handle.

As shown on the drawings:

Reference character A designates, generally, a fragmental portion of the beverage dispenser which has its walls divided into compartments for retaining insulation 10 between the front or outside wall 11 and a partition wall 12.

The present invention or valve operating mechanism is useful particularly with a beverage dispenser in which carbonated drinks are dispensed, the syrup being contained within the dispenser in a suitable compartment, and the carbonated water made available for mixing with the syrup as it is discharged from the dispenser. The parts are so arranged that a measured quantity of syrup and carbonated water is discharged every time the handle mechanism is operated to open the discharge valve. Within the interior of the dispenser is a compartment for refrigerant, such as ice, so that the contents thereof will be chilled sufficiently for immediate consumption on withdrawal from the dispenser. A valve designated generally by the reference character V is arranged within the dispenser and it is the aim of this invention to provide a manual actuator for the same.

Suitably secured within the lower portion of the dispenser structure is a plate B, having a deep hub 13, a face portion 14, at right angles to the hub 13, and about the outer periphery of which is a wall or flange 15 of cylindrical shape. As may be noted, the plate is secured in the dispenser A with the hub 13 in horizontal position and the face portion 14 thereof in a vertical position. The hub is, for a portion of its length, counterbored to receive a bushing 16. At what is shown as the left hand end of the hub, is an integral part constituting a stop 17. The plate member B is held in place by screws 18. The face 14 has an aperture 19 formed in it, below its axis, as may be seen in Figures 1 and 4, to receive a hex bushing 20 which serves as a guide for a valve stem, designated generally as 21. Through the partition 12 is an aperture 22 which receives a bushing 23 having a flange 24 to contact the inner periphery of the aperture 22, as is shown in Figures 1 and 4. The bushing 23 is threaded to receive the threaded portion of a gland member 25 having a skirt portion 26 extending inwardly of the partition 12. The skirt portion 26 constitutes a guide for a part of the valve stem 21. Surrounding the skirt portion is a spring 27 bottomed at one end against the gland member 25 and at the other end against a shoulder 28 of the valve stem 21 acting to urge the valve stem to valve closing position. A gasket 65 surrounds the stem 21 and works within the gland member 25 to prevent leakage.

Surrounding the valve stem 21 between the bushing 20 and the gland member 25 is a bellows 29 which is connected at both of its ends in leak-tight relationship to prevent access of any foreign matter to the valve stem 21. As shown in the drawings, the right hand of the bellows 29 is brazed or otherwise secured to a collar 30 which is threaded onto the hex nut 20.

Oscillatable within the bushing 16 of the hub 13 is a spindle 31 having at its left or inner end, as shown in the drawings, a notch 32 to provide a shoulder 33 adjacent the inner end of the spindle to contact, under certain conditions, with the stop 17. The spindle 31 has an outer end portion 34 of reduced diameter and with its axis oblique to the axis of the spindle. At the junction between the spindle 31 and its end 34 is an annular shoulder 35, the plane of which is at right angles to the axis of the end portion 34. The obliquity of the axis of the end portion 34 with respect to the axis of the spindle 31 is slight, say in the neighborhood of five or seven degrees.

The spindle 31 has oscillatory movement within the bushing 16 of the hub and also has limited axial movement.

A wobble member designated generally as W is formed with a central portion 36 encompassing the end 34 of the spindle in radially spaced relationship. The central portion 36 is circular, as may be noted in Figure 3, with a circular opening through it in which are ball bearings 37 the outer race 38 of which is held within the interior of the central portion 36 of the wobble member and the inner race 39 about the end 34 of the spindle.

The wobble member W has a lower end portion 40 which is in contact with exposed end of the valve stem 21. There is an upper end portion 41 offset, as may be noted in Figures 1 and 4, at the upper end of which is a ball-like head 42.

Secured against the plate face 14 is a segmental member 43 held in place by screws 44. The plate 43 is formed with a bore 45 opening through the concave surface of the plate to receive the head 42 of the wobble member W. The diameter of the bore 45 is such that the head 42 of the wobble member may move freely within the bore, vertically and rotatively, without dislodgement.

The illustrated form of handle mechanism H comprises a housing 46 somewhat domelike in appearance and cup-like in section. Integral with the housing 46 is an extension 47 on which is a ball handle or knob 48. The housing 46 has a cylindrical marginal portion 49 of slightly less outside diameter than the interior diameter of the flange 15 of the plate member B. When assembled the flange or margin 49 of the housing lies within the flange or wall 15 of the plate member, as may be readily observed in Figures 1 and 4.

Within the housing 46 is an integral boss 50 with a hollow interior. The interior of the boss, 51, in cross-section is of polygonal shape, the shape herein illustrated being hexagonal with one of the corners eliminated and a plane surface substituted, to prevent the insertion of a bushing 52, whose exterior cross sectional shape is of the same contour as the hollow portion of the boss 50, in any but one particular manner.

The bushing 52 has its outer or right hand face 53 in a plane at right angles to the axis of the bushing and which when the bushing is in place in the boss 50 engages against the bottom of the interior of the boss. The housing 46 is axially bored at 54 while the adjacent end of the bushing 52 is formed with a threaded bore 55. The bushing 52 is held in place within the boss 50 by means of a screw 56 entered through the bore 54 in the housing and in threaded engagement with the bore 55 of the bushing. The screw 56 has an enlarged head 57 the peripheral margin of which is knurled at 58. The inner surface of the screw head 57 is formed with an annular groove 59 which receives a lock washer.

The inner end face 61 (Figures 1 and 4) of the bushing 52 is inclined with respect to the axis of the bushings and lies in a plane which is transversely of and at right angles to the axis of the end 34 of the spindle 31. The inner end face 61 of the bushing 52 is bored at 62 on an angle to the axis of the bushing and with the bore axis coincident with the axis of the end 34 of the spindle. There is no relative movement between the bushing 52 and the end 34 of the spindle.

The valve plunger of valve V is engaged by stem 21 but as this valve forms no part of the present invention it is not fully illustrated or described. Suffice it to say that when the valve stem 21 is moved to the left, as viewed in the drawings, the valve V will be open, and when the valve stem is moved to the right, in the position shown in Figure 1, the valve will be closed.

The outer end of the valve stem 21 is rounded, and that portion of the lower end 40 of the wobble member W which is in contact with the valve stem is formed with a plane surface to reduce to a minimum the surface engagement between the valve stem and the wobble member.

The operation of the valve actuating mechanism of the present invention is as follows:

Referring to Figure 1, with the valve stem 21 in valve closing position, the operator grasps the ball or knob 48 of the handle mechanism and swings it downwardly, with respect to the plane of the sheet of the drawing, to the position shown in Figure 4. This movement is approximately 45 degrees.

Referring to Figure 3, the housing 46 is provided with oppositely exposed lugs 63 and 64, the lug 63 being in contact with one end of the segmental plate 43 when the valve is closed, that is when the ball handle 48 is up, as shown in Figure 1. As the housing 46 is rotated, in clockwise direction as viewed in Figure 3, the lug 63 will move away from the segmental plate 43, and the lug 64 will approach it and eventually abut it thus limiting movement of the handle in valve opening direction. When the lug 64 is against the adjacent end of the segmental plate 43, the ball handle 48 will be in the position shown in Figure 4.

As the ball handle 48 is moved from the position shown in Figure 1 to the position shown in Figure 4, the housing 46 will rotate on the axis of the screw 56, which is coincidental with the axis of the spindle 31, and by reason of the fact that the bushing 52 is non-rotatively retained in the boss 50, the bushing will rotate on its horizontal axis. Such rotation of the bushing will, by reason of the inclined crank engagement of the end 34 of the spindle with the inclined bore 62 of the bushing, sweep the end 34 of the spindle 31 in clockwise direction, as viewed in Figure 3, that is, from the raised position of Figure 1 to a lower position such as that shown in Figure 4. The axis of the spindle end 34 generates a conical surface as it is swung by said bushing and may be said to gyrate. By reason of the inclination of the inner end face 61 of the bushing 52 and its engagement with adjacent face of the central portion of the wobbler W, the wobbler will by gyrated about its head 42 as a pivot to move its lower end 40 to the left and thus move the valve stem 21 to the left, as shown in Figure 4, to thus open the passageway controlled by the valve V.

Referring to Figures 1 and 4, it will be noted that the distance between the pate 14 and the adjacent edge of the margin 49 of the housing 46 is, in Figure 1, greater than in Figure 4.

It will thus be noted that during the operation of the handle mechanism from closed to open position, the wobbler W is swung about its head 42 as a pivot to move its lower end 40 to the left, as viewed in the drawings, and at the same time is given a wobble action by reason of the inclined inner end 61 of the bushing 52 and the inclined end 34 of spindle 31. During such movement the lower end 40 of the wobble member may be said to wipe the adjacent end of the valve stem 21 or to rock on it. The relative movement between the lower end 40 and the valve stem 21 is slight so that there is no need whatsoever for any kind of lubrication between these parts.

During such rotative movement of the handle mechanism, and because of the inclined crank engagement of the end 34 of the spindle 31 with the bushing 52, the housing 46 will be moved to the left, slightly, as the swinging movement of the end 34 of the spindle tends to draw the bushing with it. The spindle will at the same time be moved to the left as well as rotated.

As the handle is moved from closed to open position, the spindle will be moved endwise as well as rotated. Rotation of the spindle, under such conditions, will move its inner end from the position shown in Figure 1 to the position shown in Figure 4, that is, with the notch 32 against the stop to limit inward spindle movement, and with the milled flat against the upper surface of the stop 17, to prevent rotation of the bushing 52 too far out of normal position under influence of spring 27, when the housing 46 is removed.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. Valve actuating means including a reciprocable valve stem, spring means for urging said stem in one direction, a handle oscillatable in a plane at right angles to the direction of stem movement, a camming surface on said handle, a substantially vertically disposed member guided at its upper end to rock and having its lower end against said stem and being operative by oscillation of the camming surface of the handle to move said stem in an opposite direction against the action of said spring.

2. Valve actuating means including a reciprocable valve stem, a handle oscillatable in a plane at right angles to the direction of stem movement, a substantially vertically disposed member guided at its upper end to rock and having its lower end against said stem and operative as a lever of the third class, and means operative by oscillation of the handle for applying pressure to said member between its ends to wobble it.

3. Valve actuating means including a reciprocable valve stem, a handle oscillatable in a plane at right angles to the direction of stem movement, a substantially vertically disposed member guided at its upper end to rock and having its lower end against said stem, and means operative by movement of said handle for imparting gyratory movement to said member for moving said stem.

4. Valve actuating means including a slidable valve stem, a handle oscillatable in a plane at right angles to the direction of stem movement, a spindle disposed with its axis coincidental with the axis of oscillation of the handle and axially spaced from said handle, said spindle having an end portion adjacent said handle of reduced diameter with its axis making an oblique angle with the spindle axis, a substantially vertically disposed rockable member guided at its upper end to rock and having its lower end against said valve stem and with its median portion surrounding and supported on said spindle end, and means operated by oscillation of the handle to swing said spindle end in a conical path about the spindle axis to thereby gyrate said member in a direction to slide the valve stem.

5. In a valve actuating mechanism for beverage dispensers in which a valve stem is horizontally reciprocable and in which spring means urge the stem in one direction, a handle member oscillatable on a horizontal axis, a horizontally disposed spindle oscillatable on an axis coincidental with that of the handle member and axially spaced from said handle member, a wobbler supported on said spindle end having a lower part against said valve stem and having an upper part encased as a pivot, said spindle and handle member having inter-engaging parts working on an axis oblique to the axis of the spindle and axis of oscillation of the handle member for the spindle by gyratory action as the handle member is oscillated, the gyratory action of said parts cooperating to move said wobbler in a manner to move the lower end thereof against the stem to urge it in an opposite direction against the action of said spring as the handle is swung in one direction, movement of the handle in the opposite direction moving the lower end of the wobbler in the opposite direction to enable said spring means to move the stem to original position.

6. In a valve actuating mechanism for a beverage dispenser which includes a horizontally reciprocable valve stem and a spring for urging the stem in one direction, handle mechanism oscillatably mounted to swing in a plane transversely of and at right angles to the length of the stem, a horizontally disposed spindle oscillatable on an axis coincidental with that of the handle mechanism axis, said spindle having its end adjacent the handle mechanism of reduced diameter and with its axis oblique to the spindle axis, a wobbler having its median portion encompassing and supported on said spindle end and with the plane of a side of said median portion at right angles to and transversely of the axis of said end, said wobbler having a substantially vertically disposed upper end encased but free to move within its encasement and with its lower end disposed against the stem, a bushing fixed to said handle mechanism with its axis coincidental with the spindle axis, the face of said bushing adjacent said spindle being planar and lying in a plane at right angles to and transversely of the axis of said spindle end, said bushing face having a cylindrical aperture, the longitudinal axis of which is coincidental with the axis of said spindle end and into which said end projects, said bushing face being in surface contact with the adjacent side of the wobbler, the engagement of the inclined face of the bushing with the wobbler side limiting retrograde movement of the wobbler by action of the stem spring when the handle mechanism is moved in a first direction, rotative movement of the handle mechanism in a second direction causing rotation of the bushing in a direction to lift the spindle end by sweeping action and which bushing movement causes the inclined face thereof to gyrate the wobbler in a direction to move the valve stem in a direction against the action of said spring.

7. Valve actuating means including a reciprocable valve stem, a handle oscillatable in a plane at right angles to and transversely of the direction of stem movement, a member mounted to function as a lever of the third class, means providing a fulcrum for one end of said member, the other end of said member being against said valve stem, and means acting on an intermediate portion of said member for imparting gyratory motion to it to wobble it to thereby cause its said other end to move said valve stem in one direction with a minimum of relative movement between said other end and said valve stem.

8. In a valve actuating mechanism, a mounting structure, a shaft rotatably mounted in said structure, a valve-actuating plunger reciprocable on an axis spaced from the axis of said shaft, a lever having one end pivotally connected to said structure and the other end arranged to engage said plunger, and rotary means including a camming surface mounted corotatably and coaxially with said shaft, said camming surface being engageable with an intermediate portion of said lever for pivotally rocking said lever relative to said structure, the other end of said lever engaging said plunger with a rolling contacting movement to reciprocatorily actuate said plunger.

9. In a valve actuating mechanism, a mounting structure, a reciprocable valve-actuating plunger, a tiltable lever having one end universally pivotable in said structure and having a free end in contact with the end of said plunger, and rotary cam means engageable with an intermediate portion of said lever for rocking said free end of said lever to move same across said plunger with a rolling contact motion, whereby said plunger will be reciprocated upon rotation of said cam means.

FRANK E. SANBORN.

REFERENCES CITED

The following references are of record in the file of this patent:

UNITED STATES PATENTS

| Number | Name | Date |
|---|---|---|
| 20,980 | Weeks | July 20, 1858 |
| 1,301,948 | Kaplan et al. | Apr. 29, 1919 |
| 1,610,683 | Kellan | Dec. 14, 1926 |
| 2,314,073 | Campbell | Mar. 16, 1943 |
| 2,317,422 | Thomsen | Apr. 27, 1943 |